(12) United States Patent
Lee et al.

(10) Patent No.: US 11,769,879 B2
(45) Date of Patent: Sep. 26, 2023

(54) STRUCTURAL ENERGY STORAGE WITH CARBON FIBER

(71) Applicant: TOYOTA MOTOR ENGINEERING & MANUFACTURING NORTH AMERICA, INC., Plano, TX (US)

(72) Inventors: Jae Seung Lee, Ann Arbor, MI (US); Paul Gilmore, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 129 days.

(21) Appl. No.: 17/372,629

(22) Filed: Jul. 12, 2021

(65) Prior Publication Data
US 2023/0009854 A1 Jan. 12, 2023

(51) Int. Cl.
*H01M 4/583* (2010.01)
*H01M 10/0525* (2010.01)
(Continued)

(52) U.S. Cl.
CPC ......... *H01M 4/583* (2013.01); *H01M 4/0407* (2013.01); *H01M 4/8673* (2013.01);
(Continued)

(58) Field of Classification Search
CPC .. H01M 4/583; H01M 4/0407; H01M 4/8673; H01M 10/0525; H01M 10/0562;
(Continued)

(56) References Cited

U.S. PATENT DOCUMENTS

2002/0061431 A1* 5/2002 Koyama ............... C08J 5/2256
429/481
2017/0018799 A1* 1/2017 Jeong ................ H01M 10/0565
(Continued)

FOREIGN PATENT DOCUMENTS

JP 2020-155335 9/2020

OTHER PUBLICATIONS

Kathleen Moyer, et al. "Carbon fiber reinforced structural lithium-ion battery composite: Multifunctional power integration for CubeSaats." *Energy Storage Materials* 24 (2020): 676-681.
(Continued)

*Primary Examiner* — Stewart A Fraser
(74) *Attorney, Agent, or Firm* — Oblon, McClelland, Maier & Neustadt, L.L.P.

(57) ABSTRACT

A coaxially arranged energy storage device suitable for energy storage and structural support for a composite component is provided. The coaxially arranged energy storage device contains an anode core of a continuous carbon fiber;, an electrolyte coating coaxially arranged on the continuous carbon fiber core; and a cathode layer coating coaxially arranged to the continuous carbon fiber core on the electrolyte coating. The electrolyte coating comprises a gel or elastomer of a cross-linked polymer and a lithium salt and a Young's modulus of the gel or elastomer of a cross-linked polymer is from 0.1 MPa to 10 Mpa. The cathode layer comprises particles of a cathode active material embedded in a matrix of an electrically conductive polymer. Methods to prepare the coaxially arranged energy storage device are described and utilities described.

25 Claims, 6 Drawing Sheets
(6 of 6 Drawing Sheet(s) Filed in Color)

(51) Int. Cl.
  *H01M 10/0565* (2010.01)
  *H01M 10/0562* (2010.01)
  *H01M 4/04* (2006.01)
  *H01M 4/86* (2006.01)

(52) U.S. Cl.
  CPC ... *H01M 10/0525* (2013.01); *H01M 10/0562* (2013.01); *H01M 10/0565* (2013.01); *H01M 2300/0071* (2013.01); *H01M 2300/0082* (2013.01); *H01M 2300/0085* (2013.01)

(58) Field of Classification Search
  CPC ..... H01M 10/0565; H01M 2300/0071; H01M 2300/0082; H01M 2300/0085
  See application file for complete search history.

(56) References Cited

U.S. PATENT DOCUMENTS

| | | | |
|---|---|---|---|
| 2019/0312256 A1* | 10/2019 | Saeki | H01M 4/75 |
| 2020/0028141 A1* | 1/2020 | Okuda | H01M 4/133 |
| 2020/0295396 A1 | 9/2020 | Onishi et al. | |
| 2021/0234231 A1* | 7/2021 | Zhang | H01M 50/414 |

OTHER PUBLICATIONS

Till Julian Adam, et al. "Multifunctional composites for future energy storage in aerospace structures." *Energies* 11, (2018), 335.

Eric D. Wetzel, "Reducing weight: Multifunctional composites integrate power, communications, and structure." *AMPTIAC Quarterly* vol. 8, No. 4 (2004): 91-95.

Yuning Meng, et al. "All-graphene core-sheath microfibers for all-solid-state, stretchable fibriform supercapacitors and wearable electronic textiles." *Advanced Materials* 25 (2013): 2326-2331.

Xiaoli Zhao, et al. "Graphene-based single fiber supercapacitor with a coaxial structure." *Nanoscale*, 7 (2015): 9399-9404.

Aditya Thakur, and Xiangyang Dong, "Printing with 3D continuous carbon fiber muttifunctional composites via UV-assisted coextrusion deposition." *Manufacturing Letters* 24 (2020): 1-5.

Simon Leijonmarck, et al. "Solid polymer electrolyte-coated carbon fibres for structural and novel micro batteries." *Composites Science and Technology* 89 (2013): 149-157.

Johanna Xu, Göran Lindbergh, and Janis Varna, "Carbon Fiber Composites with Battery Function: Stresses and Dimensional Changes Due to Li-ion Diffusion", *Journal of Composite Materials*, vol. 52 (20), 2018: 2729-2742.

Andrejs Pupurs, and Janis Varna, "Modeling mechanical stress and exfoliation damage in carbon fiber electrodes subjected to cyclic intercalation/deintercalation of lithium ions." *Composites Part B*: 65 (2014): 69-79.

Lynn M. Schneider, et al. "Bicontinuous electrolytes via thermally initiated polymerization for structural lithium ion batteries." *ACS Applied Energy Materials*, vol. 2 (2019): 4362-4369.

Niklas Ihrner, et al. "Structural lithium ion battery electrolytes via reaction induced phase-separation." *Journal of Materials Chemistry A*, vol. 5 (2017): 25652-25659.

Xiaoning Tang, and Xiong Yan. "Dip-coating for fibrous materials: mechanism, methods and applications." *Journal of Sol-Gel Science and Technology*, vol. 81.2 (2017): 378-404.

Pengfei LV, et al. "Flexible solid electrolyte based on UV cured polyurethane acrylate/succinonitrile-lithium salt composite compatibilized by tetrahydrofuran." *Composites Part B*, vol. 120 (2017): 35-41.

Ali Maziz, et al. "Knitting and weaving artificial muscles." *Science Advances*, vol. 3 (2017): e1600327, pp. 1-11.

Susumu Kuwabata, et al. "Electrochemical synthesis of composite films of manganese dioxide and polypyrrole and their properties as an active material in lithium secondary batteries." *Journal of the Electrochemical Society*, vol. 141.1 (1994): pp. 10-15.

* cited by examiner

STRUCTURAL ENERGY STORAGE WITH CARBON FIBER

FIELD OF THE DISCLOSURE

This disclosure is directed to structural energy storage devices containing a plurality of coaxially oriented lithium ion batteries having an anode of a continuous carbon fiber core, an electrolyte of a gel or elastomer coating the carbon fiber core and a cathode layer containing an active material embedded in an electrically conductive polymer on the electrolyte. The gel or elastomer of the electrolyte is composed to allow expansion of the carbon fiber upon charge and contraction during discharge without deterioration of the battery performance.

DISCUSSION OF THE BACKGROUND

The push for lightweighting in the auto industry aims to improve the fuel economy and range of both gasoline and electric vehicles (EVs). Two of the major approaches to achieving this goal are: (1) development of lightweight structural materials including aluminum, plastics, cellular materials, and composites to replace existing steel structural components, and (2) reduction of the battery pack mass through research on energy dense electrode materials such as silicon, lithium, and sulfur. While the second approach is relevant to EVs only, it is important because EVs typically weigh 10-15% more than gasoline vehicles due to the large battery pack, even with Li-ion battery energy densities tripling in the last decade.

These conventional approaches consider the battery and structure as separate components, and so the methods by which weight can be reduced are inherently limited (increase strength-to-weight ratio, increase stiffness, or increase energy density). An alternative strategy to reduce the weight is through the use of multifunctional materials that simultaneously store electrical energy and serve as the vehicle structure. The so-called "structural battery" is an emerging concept that theoretically allows the structure to store energy, therefore allowing at least, some of the battery pack to be eliminated.

Among many possible materials potentially useful for construction of structural batteries, carbon fiber is an attractive option because it has true multi-functionality at the fundamental level. Structural carbon fiber composites are used in many commercial applications, and carbon is conventionally employed as an active material in lithium-ion battery anodes. Therefore, carbon fibers have been studied and employed as a basic component for developing structural batteries. Although there are several different methods for combining carbon's energy storage and structural functions, which have been classified by degree of integration (DOI) (see Till et al. "Multifunctional Composites for Future Energy Storage in Aerospace Structures." Energies, 2018, 11, 335) the highest level of integration (DOI IV) is likely to provide the maximum structural and energy mass efficiencies and therefore, attain the greatest weight reduction. At this DOI, each individual carbon fiber is coated by an electrolyte layer and cathode layer in a co-axial arrangement. Energy storage devices with this co-axial format have been demonstrated (for example, Qu et al. Adv. Mater. 2013, 25, 2326-2331; Gao et al., Nanoscale, 2015, 7, 9399-9404; and Makimura et al. JP 2020-155335), but the objectives have been primarily to create high surface area, 3-dimensional architectures in order to improve charge discharge kinetics. The material requirements and challenges for a co-axial battery with structural function may be significantly different due to the presence of mechanical loads. Towards this goal, solid electrolytes have been coated on carbon fibers specifically for structural battery applications (see Dong et al., Manufacturing Letters, 24, 2020, 1-5; and Asp et al., Composites Science and Technology, 89, 2013, 149-157), but industrially viable devices remain to be identified.

One of the key challenges to developing the co-axial structural battery is the stability of the interface between the carbon fiber and electrolyte coating. During charging, the carbon fiber anode experiences a volume expansion of about 1% in the axial direction and 1-2% in the radial direction due to lithium ion intercalation. Meanwhile, the cathode may experience a volume contraction due to lithium removal. A conventional co-axial structural battery is schematically diagrammed in FIG. 1 and the volume changes upon charging schematically shown in FIG. 2. Volume change upon discharge (not shown) would be the reverse of FIG. 2. Such volume changes cause large stresses at the carbon fiber-electrolyte interface that can exceed 400 MPa in the axial direction and 140 MPa in the radial direction depending on the geometry and material properties. These stresses cause delamination and cracking of the fiber even in the absence of mechanical loading and result in low cycle life. Therefore, a coaxial battery structure arranged to have minimal or no interfacial stress during charge and discharge while maintaining good contact between the layers is needed. Further, a method to prepare such coaxial battery structure and utilize the structure in applications wherein energy storage and utilization are in concert with structural integrity is needed.

SUMMARY OF THE DISCLOSURE

These and other objects are addressed by the present disclosure, the first embodiment of which provides a coaxial energy storage device, comprising:
  an anode core of a continuous carbon fiber;
  an electrolyte coating coaxially arranged on the continuous carbon fiber core; and
  a cathode layer coating coaxially arranged to the continuous carbon fiber core on the electrolyte coating;
  wherein the electrolyte coating comprises a gel or elastomer of a cross-linked polymer and a lithium salt, the cathode layer comprises particles of a cathode active material embedded in a matrix of an electrically conductive polymer, and a Young's modulus of the gel or elastomer of a cross-linked polymer is from 0.1 MPa to 10 MPa.

In an aspect of the first embodiment a reversible tensile strain of the gel or elastomer of a cross-linked polymer of the electrolyte coating is at least 10%.

In an aspect of the first embodiment a diameter of the continuous carbon fiber core is from 5 to 50 µm.

In an aspect of the first embodiment the continuous carbon fiber is a polyacrylonitrile (PAN) based fiber selected from the group consisting of low modulus fibers (less than 32 million $lbf/in^2$), standard modulus fibers (33-36 Msi), intermediate modulus fibers (40-50 Msi), high modulus fibers (50-70 Msi) and ultrahigh modulus fibers (70-140 Msi).

In an aspect of the first embodiment the continuous carbon fiber is a PAN based fiber selected from the group consisting of fibers having a tow from 1 to 24K.

In an aspect of the first embodiment the continuous carbon fiber is a PAN based fiber having a carbon content of 93% or greater.

In an aspect of the first embodiment the continuous carbon fiber is a PAN based fiber sized with an agent selected from the group consisting of an epoxy resin, a urethane resin and a vinyl ester resin.

In an aspect of the first embodiment the continuous carbon fiber is a de-sized PAN based fiber and in a special aspect the de-sized continuous carbon PAN based fiber is surface activated.

In an aspect of the first embodiment the lithium ion conductivity of the electrolyte coating is at least $10^{-6}$ mS/cm at room temperature.

In an aspect of the first embodiment the gel or elastomer of the electrolyte coating comprises at least one crosslinked polymer selected from the group consisting of a polyurethane, a polyacrylonitrile, a polyacrylate, polymethylmethacrylate, a polyurethane acrylate, a polyethoxylated trimethylolpropane triacrylate, polyvinylidene fluoride, a polyenaminonitrile and a polyethylene glycol.

In an aspect of the first embodiment the gel or elastomer of the electrolyte coating comprises at least one plasticizer.

In an aspect of the first embodiment the gel or elastomer of the electrolyte coating comprises a plastic crystal electrolyte.

In an aspect of the first embodiment the lithium salt in the gel or elastomer of the electrolyte coating comprises at least one selected from the group consisting of LiTFSI, $LiBF_4$, $LiPF_6$, $LiClO_4$, $LiCF_3SO_3$, LiCl and $LiAsF_6$.

In an aspect of the first embodiment the cathode active material is at least one selected from the group consisting of a lithium nickel manganese cobalt oxide ($LiNiCoMnO_2$) (NMC), a lithium iron phosphate ($LiFePO_4$), a lithium nickel manganese spinel ($LiNi_{0.5}Mn_{1.5}O_4$), a lithium nickel cobalt aluminum oxide ($LiNiCoAlO_2$) (NCA), a lithium manganese oxide ($LiMn_2O_4$) and a lithium cobalt oxide ($LiCoO_2$).

In an aspect of the first embodiment the particle size of the cathode active material is 30 µm or less.

In an aspect of the first embodiment the electrically conductive polymer of the cathode layer is at least one selected from the group consisting of a poly(3,4-ethylenedioxythiophene (PEDOT), a poly(thiophene), a poly(p-phenylene sulfide), a poly(pyrrole), a polycarbazole, a polyindole, a polyazepine, a polyaniline, a poly(fluorene), a polyphenylene, a polypyrene, a polyazulene, a polynaphthalene, a poly(acetylene) and a poly(p-phenylene vinylene).

In an aspect of the first embodiment the cathode layer comprises a conductive polymer seed layer obtained by electroless deposition contacting the electrolyte layer and a conductive polymer layer on the seed layer comprising the particles of cathode active material. In a further aspect the conductive polymer of the seed layer is selected from the group consisting of PEDOT, polypyrrole and polyaniline.

In a second embodiment the present disclosure provides a structural composite, comprising a shell having a structured shape; and a matrix enclosed by the shell; wherein the matrix comprises a plurality of coaxial energy storage devices according to the first embodiment and all aspects thereof.

In an aspect of the second embodiment the shell having a structured shape comprises a metal or a fiber reinforced plastic.

In an aspect of the second embodiment the matrix enclosed by the shell comprises a resin selected from the group consisting of (meth)acrylate resins, epoxy resins, diallyl phthalate resins and phenolic resins.

In an aspect of the second embodiment the coaxial energy storage devices are arranged unidirectionally and in parallel.

In an aspect of the second embodiment the coaxial energy storage devices are arranged as a mat arrangement having both weft and warp orientations.

In a third embodiment the present disclosure provides a method to prepare the coaxial energy storage device of the first embodiment, comprising:
  preparing a UV curable gel or elastomer electrolyte precursor solution;
  coating a continuous carbon fiber with the UV curable electrolyte precursor solution;
  exposing the UV curable electrolyte precursor solution coating on the continuous carbon fiber to UV energy to cure the coating to obtain a gel or elastomer electrolyte coating coaxial to the continuous carbon fiber;
  applying a conductive polymer seed layer coating on the cured electrolyte coating by electroless deposition; and
  electrolytically depositing a conductive polymer layer on the seed layer from a conductive polymer monomer precursor solution containing particles of a cathode active material to obtain a coaxially arranged cathode layer;
  wherein the UV curable electrolyte precursor solution comprises a lithium salt, a polymer or monomer which solvates lithium ion, a gel or elastomer matrix polymer or oligomer, a UV sensitive cross-linking agent, a photoinitiator and a plasticizer, the UV curable electrolyte precursor solution forms a contact angle on the surface of the continuous carbon fiber of 100° or less, and
  the cathode active material particles are entrapped within the conductive polymer matrix obtained by the electrolytic deposition.

In a fourth embodiment the present disclosure provides a method to prepare the structural composite of the second embodiment, comprising:
  preparing a UV curable gel or elastomer electrolyte precursor solution;
  coating a plurality of continuous carbon fibers with the UV curable electrolyte precursor solution;
  exposing the UV curable electrolyte precursor solution coating on the continuous carbon fibers to UV energy to cure the coating to obtain a gel or elastomer electrolyte coating coaxial to each of the continuous carbon fiber;
  applying a conductive polymer seed layer coating on the cured electrolyte coating of each of the continuous carbon fibers by electroless deposition; and
  electrolytically depositing a conductive polymer layer on the seed layer of each of the continuous carbon fibers from a conductive polymer monomer precursor solution containing particles of a cathode active material to obtain a coaxially arranged cathode layer;
  arranging the plurality of continuous carbon fibers within a shell having a structured shape;
  filing the structured shell with a precursor monomer of a thermoset resin; and
  curing the thermoset resin precursor to obtain the structural composite;
  wherein the UV curable electrolyte precursor solution comprises a lithium salt, a polymer or monomer which solvates lithium ion, a gel or elastomer matrix polymer or oligomer, a UV sensitive cross-linking agent, a photoinitiator and a plasticizer, the UV curable electrolyte precursor solution forms a contact angle on the surface of the continuous carbon fiber of 100° or less, and the cathode active material particles are entrapped within the conductive polymer matrix obtained by the electrolytic deposition.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The inventors recognized that if the above-identified problems associated with a coaxial arranged battery employing a carbon fiber core anode were eliminated the possible weight reduction in an electrical vehicle via this concept would be substantial. In an ideal case, if the structural battery has the same energy density and stiffness as the conventional battery and structure respectively, the mass of the vehicle may be reduced by as much as 25-35%. However, even if the ideal is not achieved, significant weight reduction would still be possible depending on the structural mass efficiency and structural energy efficiency attained with the device. Moreover, the concept may be extended to a wide range of utilities where the marriage of energy storage and structural form and support could be beneficial.

Figure 1:
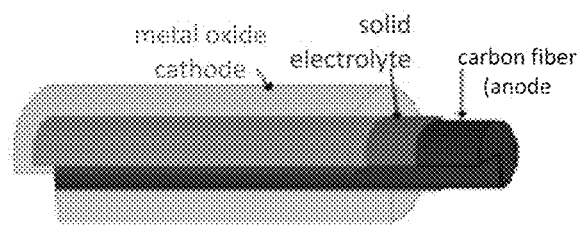
FIG. 1 is a schematic drawing showing the structure of a conventional coaxial energy storage device.
Figure 2:
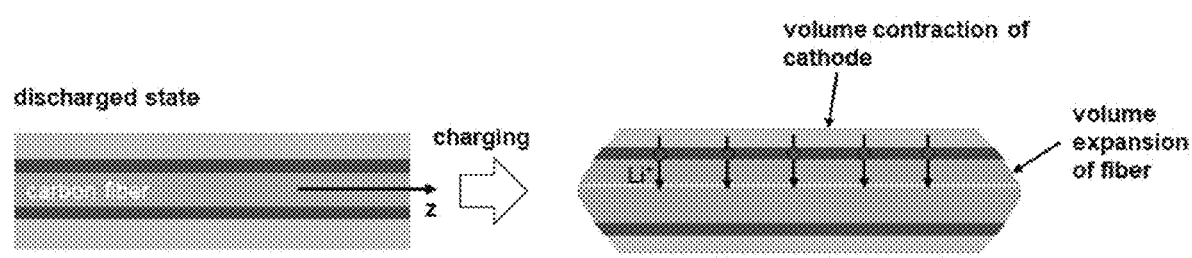
FIG. 2 is a schematic drawing showing effect of lithium ion intercalation on a coaxially arranged carbon fiber lithium ion battery.
Figure 3:
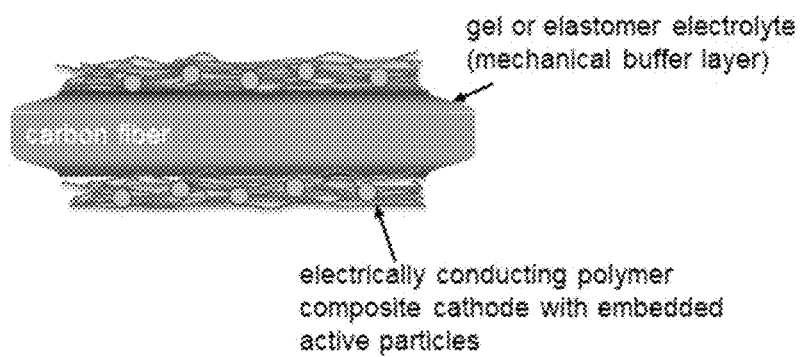
FIG. 3 shows a schematic drawing of a coaxial energy storage device according to an embodiment of the disclosure.

The present inventive concept is directed to reduction of the interfacial stresses in co-axial structural batteries is summarized in FIG. 3. The invention includes two main components:

1. A mechanically compliant electrolyte coated onto the carbon fiber that acts as a mechanical buffer layer between the carbon fiber and cathode while simultaneously conducting lithium ions.

2. A composite cathode designed to have a very low volume expansion by embedding active material particles in a conductive polymer matrix.

The mechanically compliant electrolyte may have low stiffness but provides good adhesion to the anode and cathode.

The inventors recognize that the stresses in the carbon fiber during charging arise from both the interactions with the interface as previously described and Li-ion concentration gradients within the fiber bulk. Component 1 works to reduce stresses due to the interactions at the interface. Stress due to Li-ion concentration gradient may be addressed by control of the carbon fiber core structure to employ small diameter carbon fibers.

By design of the electrolyte to have a low elastic modulus, the anode and cathode may swell and contract during charge and discharge cycles and yet interact with the electrolyte with low stress and thus provide a battery having longevity of stability and integrity of the structure.

Thus, in the first embodiment the present disclosure provides a coaxial energy storage device, comprising: an anode core of a continuous carbon fiber; an electrolyte coating coaxially arranged on the continuous carbon fiber core; and a cathode layer coating coaxially arranged to the continuous carbon fiber core on the electrolyte coating; wherein the electrolyte coating comprises a gel or elastomer of a cross-linked polymer and a lithium salt and the cathode layer comprises particles of a cathode active material embedded in a matrix of an electrically conductive polymer. In order to provide the elasticity to the device as described above the electrolyte gel or elastomer of a cross-linked polymer is composed to have a Young's modulus of less than 20 Mpa, preferably less than 15 Mpa and most preferably of from 0.1 MPa to 10 MPa. Correspondingly, the reversible tensile strain of the gel or elastomer of a cross-linked polymer is at least 10%, preferably at least 12% and most preferably at least 14%.

The continuous carbon fiber may be selected from any carbon fiber conventionally known and generally is selected from a PAN based fiber, a pitch based fiber, rayon based carbon fibers and a $SnO_2/C$ fiber. The choice will depend upon the end-use requirements of the structural device.

As described previously, in order to minimize stress due to formation of a lithium ion concentration gradient within the fiber the diameter of the fiber is 80 μm or less, preferably 60 μm or less and most preferably, from 5 to 50 μm.

In an aspect of the first embodiment the continuous carbon fiber is a polyacrylonitrile (PAN) based fiber selected from the group consisting of low modulus fibers (less than 32 million $lbf/in^2$), standard modulus fibers (33-36 Msi), intermediate modulus fibers (40-50 Msi), high modulus fibers (50-70 Msi) and ultrahigh modulus fibers (70-140 Msi). Preferably, in structural devices requiring high strength intermediate, high or ultrahigh modulus fibers are employed.

In an aspect of the first embodiment the continuous carbon fiber is a PAN based fiber selected from the group consisting of fibers having a tow from 1 to 48K, preferably 1 to 24K and most preferably 1 to 12K. As indicated above the size selected will be dictated by the end use requirements of the structural battery device.

In an aspect of the first embodiment the continuous carbon fiber is a PAN based fiber having a carbon content of 93% or greater, preferably 98% or greater and most preferably 99% or greater.

In some devices the continuous carbon fiber can be sized with an agent selected from the group consisting of an epoxy resin, a urethane resin and a vinyl ester resin. In other devices the continuous carbon fiber may be desized and in one special aspect the continuous carbon fiber may be a de-sized PAN based fiber which is surface activated. Methods of surface activation are conventionally known to one of skill in the art.

The electrolyte coating is applied to be coaxially arranged and in direct contact with the entire surface of the continuous carbon fiber within the battery construct. The electrolyte must be lithium ion conductive and have a conductivity of at least $10^{-6}$ mS/cm at room temperature, preferably at least $10^{-4}$ mS/cm and most preferably $10^{-2}$ mS/cm. The thickness of the electrolyte layer on the carbon fiber core can be adjusted depending upon the conductivity of the electrolyte. Where conductivity is lower such as $10^{-6}$ mS/cm the thickness may be reduced to a value to correspond to a desired total ionic resistance. With electrolytes having higher conductivity the thickness of the electrolyte coating may be increased such the same total ionic resistance is the same target value. However, at greater thickness the elastic stress level or interfacial stress reduction obtained may be increased according to the objective of the electrolyte described previously.

Optimization of the electrolyte thickness is crucial. If the thickness is too large, the carbon fiber volume fraction will have to be reduced in order to keep the sum of all volume fractions (carbon, electrolyte, cathode, and matrix) equal to 1. On the other hand, if the thickness is too small, the electrolyte won't be effective to reduce the interfacial stress. Although the overall diameter of the coaxial battery may be varied as described later, the depth of the electrolyte coating on the carbon fiber surface may be from 2 μm to 100 μm, preferably, 3 μm to 30 μm and most preferably 4 μm to 20 μm.

The gel or elastomer of the electrolyte coating comprises at least one crosslinked polymer selected from the group consisting of a polyurethane, a polyacrylonitrile, a polyacrylate, polymethylmethacrylate, a polyurethane acrylate, a polyethoxylated trimethylolpropane triacrylate, polyvinylidene fluoride, polyenaminonitrile and a polyethylene glycol.

In an aspect of the first embodiment the gel or elastomer of the electrolyte coating comprises at least one plasticizer. Materials employed as plasticizers must be stable to the chemical and electrochemical environment within the anode-cathode intermediate region and compatible with the polymer and salts present. Example plasticizers include but are not limited to carbonates such as propylene carbonate, ethylene carbonate, diethyl carbonate, dimethyl carbonate, ethyl methyl carbonate and fluorinated derivatives of these carbonates, and ethers conventionally employed as electrolyte solvents such as dimethoxy ethane, tetraethylene glycol dimethyl ether, tetrahydrofuran and 1,4-dioxane.

In an aspect of the first embodiment the gel or elastomer of the electrolyte coating comprises a plastic crystal electrolyte. Examples of such materials are described by Tang et al. (Composites Part B 120 (2017) 35-41).

As previously described, the electrolyte gel or elastomer of a cross-linked polymer is composed to have a Young's modulus of less than 20 Mpa, preferably less than 15 Mpa and most preferably of from 0.1 MPa to 10 MPa. Correspondingly, the reversible tensile strain of the gel or elastomer of a cross-linked polymer is at least 10%, preferably at least 20% and most preferably at least 30%.

Young's Modulus can be determined according to ASTM E11 Standard Test Method and instruments to conduct this testing are commercially available. The reversible tensile strength may be measured according to ASTM D2061 and instruments to conduct this testing are commercially available.

As recognized by one of skill in the art the electrolyte gel or elastomer of a cross-linked polymer of the present disclosure has a relatively low Young's modulus and thus a low stiffness. Further, by requiring a reversible tensile strain of at least 10% the electrolyte is designed to be capable to expand and contract in concert with the change in volume of the anode and cathode without structural and electrochemical deterioration or with minimal structural and electrochemical deterioration.

Figure 6:
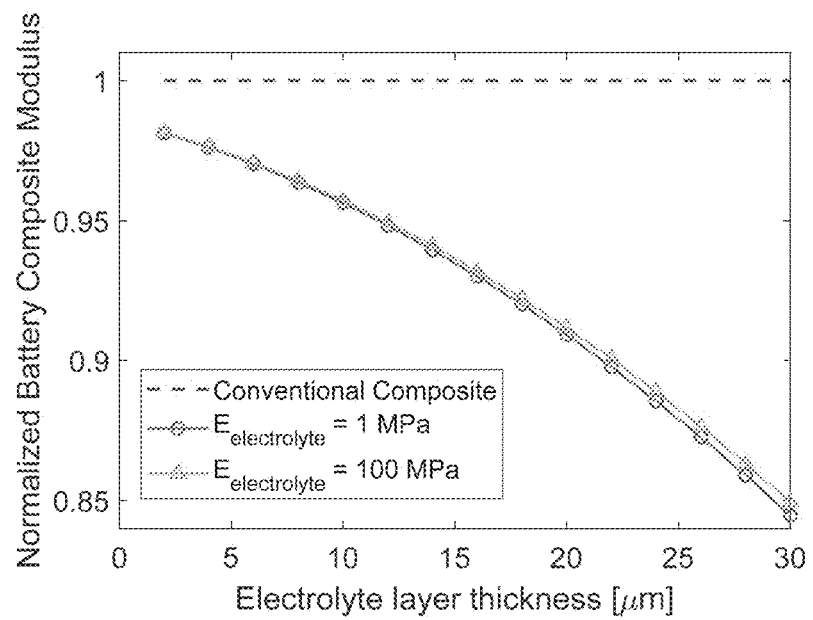
FIG. 6 shows a graphical relationship between structural modulus of a coaxial energy storage device according to an embodiment of the disclosure and electrolyte layer thickness.

According to the present disclosure the electrolyte is formulated to have a low elastic modulus, which allows the anode and cathode to swell and contract freely with low stress. This requirement initially appears to conflict with the purpose of structural batteries to have good load-bearing capabilities. However, the inventors have determined it is possible to have a low electrolyte stiffness while minimizing the effect on overall composite modulus of the structural battery as shown in FIG. 6. The carbon fiber radius and volume fraction of the coaxial battery structure were set to 24 μm and 25% respectively for this sample calculation. The overall composite modulus decreases by only 15% when the electrolyte has a modulus of 1 MPa and thickness of 29 μm. However, optimization of the electrolyte thickness in relation to the total requirements of the structural battery must be determined. If the thickness is too large, the carbon fiber volume fraction will have to be reduced in order to keep the sum of all volume fractions (carbon, electrolyte, cathode, and matrix) equal to the target total volume. On the other hand, if the thickness is too small, the electrolyte won't be effective to reduce the interfacial stress.

The lithium salt provided in the gel or elastomer of the electrolyte coating comprises at least one selected from the group consisting of LiTFSI, $LiBF_4$, $LiPF_6$, $LiClO_4$, $LiCF_3SO_3$, LiCl and $LiAsF_6$. Combinations of these may be employed and other additives to enhance lithium ion conductivity may be included.

The cathode layer is arranged coaxial to the continuous carbon fiber core and coats the surface of the electrolyte not in contact with the carbon fiber core. The cathode layer comprises particles of a cathode active material embedded in a matrix comprising a conductive polymer. This arrangement provides a cathode structure coating which has a low volume of expansion upon discharge and minimal contraction upon charge of the battery while providing a high electric conductivity. Such performance results because the individual particles may expand and contract; however, the effect of the expansion and contraction is mainly constrained within the conductive polymer matrix and only minimal effect is exerted to the electrolyte coating.

The cathode active material is at least one selected from the group consisting of a lithium nickel manganese cobalt oxide ($LiNiCoMnO_2$) (NMC), a lithium iron phosphate (LiFePO$_4$), a lithium nickel manganese spinel (LiNi$_{0.5}$Mn$_{1.5}$O$_4$), a lithium nickel cobalt aluminum oxide (LiNiCoAlO$_2$) (NCA), a lithium manganese oxide (LiMn$_2$O$_4$) and a lithium cobalt oxide (LiCoO$_2$).

The cathode active material particle size of the cathode active material is 30 µm or less, preferably 25 µM or less and most preferably 20 µm or less. By confining the particle size to a range of from 5 µm to 30 µM, sufficient battery capacity may be obtained while minimizing the volume change stress applied to the interface of the electrolyte and cathode coatings.

The electrically conductive polymer of the cathode layer may be any known electrically conductive polymer and may be at least one polymer selected from the group consisting of a poly(3,4-ethylenedioxythiophene (PEDOT), a poly (thiophene), a poly(p-phenylene sulfide), a poly(pyrrole), a polycarbazole, a polyindole, a polyazepine, a polyaniline, a poly(fluorene), a polyphenylene, a polypyrene, a polyazulene, a polynaphthalene, a poly(acetylene) and a poly(p-phenylene vinylene).

Because the cathode coating may be deposited electrolytically as described below the cathode may contain two layers of conductive polymer wherein the first layer adjacent to and contacting the electrolyte coating contains a conductive polymer which is applied by an electroless deposition process. Such application is necessary because the electrolyte coating is not electrically conductive. A method to apply coatings of conductive polymers in two operations using an initial electroless deposition and then an electrolytic deposition is described by Maziz et al. (Sci. Adv. 2017; 3:e1600327, Jan. 25, 2017).

The conductive polymer of the seed layer may be any conductive polymer which can be deposited by an electroless method and may preferably be selected from the group consisting of PEDOT, polypyrrole and polyaniline.

The thickness of the cathode coating will ultimately be determined by the end use requirements of the structural battery device. Generally the cathode coating may be from 10 µm to 60 µm, preferably 15 µm to 40 µM and most preferably from 20 µm to 40 µm.

The coaxial energy storage device may be prepared by first coating a continuous carbon fiber as described above with an electrolyte precursor coating solution containing a lithium salt, a polymer or monomer which solvates lithium ion, a gel or elastomer matrix polymer or oligomer, a UV sensitive cross-linking agent, a photoinitiator and a plasticizer. The polymer or monomer which solvates lithium ion and the gel or elastomer matrix polymer or oligomer may be the same material and correspond to the polymers previously described for the electrolyte or the precursors thereof.

Materials suitable as lithium salts have been previously described.

Conventionally known photoinitiators compatible with the polymer and/or oligomer are employed and may include but are not limited to any of aminoacetophenones, phosphine oxides, benzophenones, benzyl formates and thioxanthones. Such photoinitiators are commercially available.

The cross-linking agent employed is determined by the polymer of oligomer structure and is well known to one of skill in the art.

The electrolyte material composition is dissolved in a carbonate solvent or ether solvent system and my then be applied to the continuous carbon fiber by any suitable coating method which applies a uniform and complete coating to the entire carbon fiber surface. In preparing the electrolyte coating composition it is necessary to prepare a composition which forms a contact angle on the carbon fiber surface of 100° or less. The lower the contact angle the thinner the coating that can be applied to the carbon fiber. The contact angle may be controlled by selection of solvent, plasticizer and concentration of the lithium salt and polymer.

Once the electrolyte coating is applied to the continuous carbon fiber, it is exposed to UV irradiation to cure the polymer matrix coaxially arranged about the carbon fiber which is now the core of the device. The solvent and other volatile materials remaining in the cured coating may be removed by drying to obtain the elastic electrolyte coating layer.

Next the cathode coating is applied to the surface of the elastic electrolyte coating.

Because the electrolyte is not electrically conductive it is necessary to apply the coaxially arranged composite cathode in a two stage process similar to the method described by Maziz et al. (Sci. Adv. 2017;3:e1600327) as previously referenced. According to this method a conducting polymer seed layer is first formed by an electroless deposition process wherein, for example, the electrolyte coated continuous carbon fiber is coated with an aqueous solution containing a conductive polymer precursor such as 3,4-ethylenedioxythiophene, pyrrole or aniline. The aqueous solution also contains a surfactant such as but not limited to sodium dodecylbenzene sulfonate to promote formation of a uniform and homogeneous solution. Then a second aqueous solution containing an oxidizing agent such as but not limited to ferric chloride (FeCl$_3$) is applied to the conductive polymer precursor coating to oxidize the precursor and form the conductive polymer seed layer. Following the formation of the conductive seed layer a standard electrodeposition is applied to form the remainder of the cathode layer.

In the electrodeposition the active material particles as previously described are suspended in a solvent solution of the conductive polymer monomer and a lithium salt. A three-electrode cell with the conductive polymer seed layer as the working electrode is employed for the electrodeposition. When an oxidizing potential is applied to the seed layer working electrode the conductive polymer monomer polymerizes on the surface of the seed layer. In the course of the conductive polymer formation the active material particles suspended in the solution become entrapped within the electrodeposited conductive polymer layer. A similar method of entrapment of active particles in a conductive polymer on a planar surface is described by Kuwabata et al. (Journal of the Electrochemical Society, 141.1(1994)). The capacity of the cathode can be controlled by performing the electrodeposition at a constant potential until the desired thickness is obtained. Conducting polymers are redox active materials; however, the active materials are selected to have high redox potential such that the redox potential of the conductive polymer is significantly lower than the active material and the conductive polymer performs only as an electrically conductive matrix and not as an active material.

Thus, the present disclosure provides a method to prepare the coaxial energy storage device described above, comprising:

preparing a UV curable gel or elastomer electrolyte precursor solution;

coating a continuous carbon fiber with the UV curable electrolyte precursor solution;

exposing the UV curable electrolyte precursor solution coating on the continuous carbon fiber to UV energy to cure the coating to obtain a gel or elastomer electrolyte coating coaxial to the continuous carbon fiber;

applying a conductive polymer seed layer coating on the cured electrolyte coating by electroless deposition; and electrolytically depositing a conductive polymer layer on the seed layer from a conductive polymer monomer precursor solution containing particles of a cathode active material to obtain a coaxially arranged cathode layer;

wherein the UV curable electrolyte precursor solution comprises a lithium salt, a polymer or monomer which solvates lithium ion, a gel or elastomer matrix polymer or oligomer, a UV sensitive cross-linking agent, a photoinitiator and a plasticizer, the UV curable electrolyte precursor solution forms a contact angle on the surface of the continuous carbon fiber of 80° or less, and the cathode active material particles are entrapped within the conductive polymer matrix obtained by the electrolytic deposition.

The coaxial energy storage device is employed as a component of a structural battery composite wherein the coaxial energy devices simultaneously serve in function both for energy storage and structural support. Thus, a plurality of the coaxial energy storage device is arranged within a shaped composite structure having a shell or outer coating and an inner matrix enclosed by the shell. The matrix encloses the plurality of coaxial energy storage devices.

Figure 4:
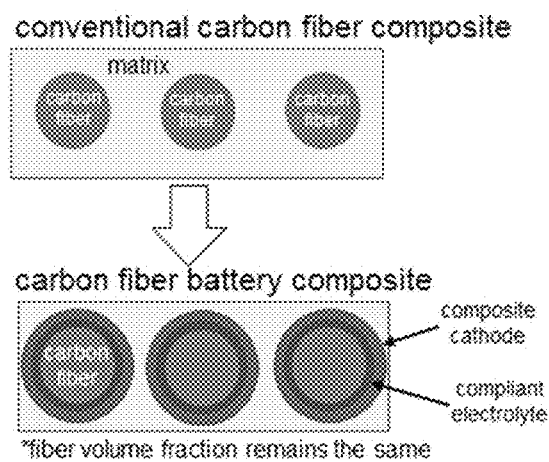
FIG. 4 shows a schematic drawing of a structural arrangement of coaxial energy storage devices in a shell according to an embodiment of the disclosure.
Figure 5:
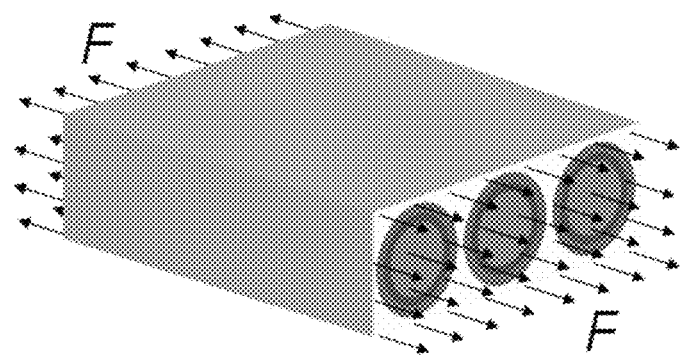
FIG. 5 shows another schematic drawing of a structural arrangement of coaxial energy storage devices in a shell according to an embodiment of the disclosure.

Once the electrolyte and cathode layers are coated onto the carbon fibers, the coaxial energy storage devices are arranged within a shell having a structure and are subsequently impregnated with a matrix material as schematically represented in FIGS. 4 and 5. The composite structure schematically represented in FIGS. 4 and 5 with embedded energy storage can be formed to perform in a wide variety of structural applications while provided electrical power to devices requiring energy or supplementing the energy requirement of the device.

The shell may be composed of a metal and/or a fiber reinforced plastic. Materials employed for such sandwich shell matrix composites are conventionally known for example in the construction of airplane components, automobile components, protective equipment and other vehicles for transportation and sport.

The matrix enclosed by the shell comprises a resin selected from the group consisting of (meth)acrylate resins, epoxy resins, diallyl phthalate resins and phenolic resins.

The coaxial energy storage devices may be arranged within the composite structure in any arrangement. For example, unidirectionally and in parallel, in a mat arrangement wherein the coaxial energy storage device are oriented both in weft and warp orientations or in only one of weft and warp while the other direction is occupied by a structural fiber such as a glass fiber, a carbon fiber or an aramid fiber.

The above description is presented to enable a person skilled in the art to make and use the embodiments and aspects of the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. In this regard, certain embodiments within the disclosure may not show every benefit of the disclosure, considered broadly.

The invention claimed is:

1. A coaxial energy storage device, comprising:
an anode core of a continuous carbon fiber;
an electrolyte coating coaxially arranged on the continuous carbon fiber core; and
a cathode layer coating coaxially arranged to the continuous carbon fiber core on the electrolyte coating;
wherein
the electrolyte coating comprises a gel or elastomer of a cross-linked polymer and a lithium salt,
the cathode layer comprises a conductive polymer seed layer contacting the electrolyte layer and a layer comprising particles of a cathode active material embedded in a matrix of an electrically conductive polymer on the conductive polymer seed layer, and
a Young's modulus of the gel or elastomer of a cross-linked polymer is from 0.1 MPa to 10 MPa.

2. The coaxial energy storage device of claim 1 wherein a reversible tensile strain of the gel or elastomer of a cross-linked polymer of the electrolyte coating is at least 10%.

3. The coaxial energy storage device of claim 1 wherein a diameter of the continuous carbon fiber core is from 5 to 50 um.

4. The coaxial energy storage device of claim 1 wherein the continuous carbon fiber is a PAN based fiber selected from the group consisting of low modulus fibers (less than 32 million $lbf/in^2$), standard modulus fibers (33-36 Nisi), intermediate modulus fibers (40-50 Msi), high modulus fibers (50-70 Msi) and ultrahigh modulus fibers (70-140 Msi).

5. The coaxial energy storage device of claim 1 wherein the continuous carbon fiber is a PAN based fiber selected from the group consisting of fibers having a tow from 1 to 24K.

6. The coaxial energy storage device of claim 1 wherein the continuous carbon fiber is a PAN based fiber having a carbon content of 93% or greater.

7. The coaxial energy storage device of claim 1 wherein the continuous carbon fiber is a PAN based fiber sized with an agent selected from the group consisting of an epoxy resin, a urethane resin and a vinyl ester resin.

8. The coaxial energy storage device of claim 1 wherein the continuous carbon fiber is a de-sized PAN based fiber.

9. The coaxial energy storage device of claim 8 wherein the de-sized continuous carbon PAN based fiber is surface activated.

10. The coaxial energy storage device of claim 1 wherein the lithium ion conductivity of the electrolyte coating is at least $10^{-6}$ MS/cm at room temperature.

11. The coaxial energy storage device of claim 1 wherein the gel or elastomer of the electrolyte coating comprises at least one crosslinked polymer selected from the group consisting of a polyurethane, a polyacrylonitrile, a polyactylate, polymethylmethacrylate, a polyurethane acrylate, a polyethoxylated trimethyolpropane triacrylate, polyvinylidene fluoride, polyenaminonitrile and a polyethylene glycol.

12. The coaxial energy storage device of claim 1 wherein the gel or elastomer of the electrolyte coating comprises at least one plasticizer.

13. The coaxial energy storage device of claim 1 wherein the gel or elastomer of the electrolyte coating comprises a plastic crystal electrolyte.

14. The coaxial energy storage device of claim 1 wherein the lithium salt in the gel or elastomer of the electrolyte coating comprises at least one selected from the group consisting of LiTFSI, $LiBF_4$, $LiPF_6$, $LiClO_4$, $LiCF_3SO_3$, LiCl and $LiAsF_6$.

15. The coaxial energy storage device of claim 1 wherein the cathode active material is at least one selected from the group consisting of a lithium nickel manganese cobalt oxide ($LiNiCoMnO_2$) (NMC), a lithium iron phosphate ($LifePO_4$), a lithium nickel manganese spinel ($LiNi_{0.5}Mn_{1.5}O_4$), a lithium nickel cobalt aluminum oxide ($LiNiCoAlO_2$) (NCA), a lithium manganese oxide ($LiMn_2O_4$) and a lithium cobalt oxide ($LiCoO_2$).

16. The coaxial energy storage device of claim 1 wherein the particle size of the cathode active material is 30 µm or less.

17. The coaxial energy storage device of claim 1 wherein the electrically conductive polymer of the cathode layer is at least one selected from the group consisting of a poly(3,4-ethylenedioxythiophene (PEDOT), a poly(thiophene), a poly(p-phenylene sulfide), a poly(pyrrole), a polycarbazole, a polyindole, a polyazepine, a polyaniline, a poly(fluorene), a polyphenylene, a polypyrene, a polyazulene, a polynaphthalene, a poly(acetylene) and a poly(p-phenylene vinylene).

18. The coaxial energy storage device of claim 1 wherein the conductive polymer seed layer contacting the electrolyte layer is obtained by electroless deposition.

19. The coaxial energy storage device of claim 18 wherein the conductive polymer of the seed layer is selected from the group consisting of PEDOT, polypyrrole and polyaniline.

20. A structural composite, comprising:
   a shell having a structured shape; and
   a matrix enclosed by the shell;
   wherein
   the matrix comprises a plurality of coaxial energy storage devices according to claim 1.

21. The structural composite according to claim 20, wherein the matrix enclosed by the shell comprises a resin selected from the group consisting of (meth)acrylate resins, epoxy resins, diallyl phthalate resins and phenolic resins.

22. The structural composite according to claim 21, wherein the shell having a structured shape comprises a metal or a fiber reinforced plastic.

23. The structural composite of claim 21 wherein the coaxial energy-storage devices are arranged unidirectionally and in parallel.

24. The structural composite of claim 21 wherein the coaxial energy storage devices are arranged as a mat arrangement having both weft and warp orientations.

25. A method to prepare the coaxial energy storage device of claim 1, comprising:
   preparing a UV curable gel or elastomer electrolyte precursor solution;
   coating a continuous carbon fiber with the UV curable electrolyte precursor solution;
   exposing the UV curable electrolyte precursor solution coating on the continuous carbon fiber to UV energy to cure the coating to obtain a gel or elastomer electrolyte coating coaxial to the continuous carbon fiber;
   applying a conductive polymer seed layer coating on the cured electrolyte coating by, electroless deposition; and
   electrolytically depositing a conductive polymer layer on the seed layer from a conductive polymer monomer precursor solution containing particles of a cathode active material to obtain a coaxially arranged cathode layer;
   wherein
   the UV curable electrolyte precursor solution comprises a lithium salt, a polymer or monomer which solvates lithium ion, a gel or elastomer matrix polymer or oligomer, a UV sensitive cross-linking agent, a photoinitiator and a plasticizer,
   the UV curable electrolyte precursor solution forms a contact angle on the surface of the continuous carbon fiber of 100° or less, and
   the cathode active material particles are entrapped within the conductive polymer matrix obtained by the electrolytic deposition.

* * * * *